March 7, 1933.    F. W. GAY    1,900,494

POWER TRANSMISSION SYSTEM

Filed Dec. 16, 1930

INVENTOR
Frazer W. Gay

Patented Mar. 7, 1933

1,900,494

UNITED STATES PATENT OFFICE

FRAZER W. GAY, OF NEWARK, NEW JERSEY

POWER TRANSMISSION SYSTEM

Application filed December 16, 1930. Serial No. 502,734.

This invention relates to a novel means of transmitting power over a plurality of transmission lines. In my patent application Serial No. 312,085 I show a construction whereby power may be transmitted over two parallel transmission lines and a fault on one such line will carry only the magnetizing current of the transformers at the sending and receiving ends of the lines used by the novel construction.

The present invention utilizes three parallel transmission lines with reactor-transformer means at the sending and receiving ends adapted to transform the power normally carried by a faulty line and cause this power to be fed over the nonfaulty lines.

In the preferred form, a three phase transmission system employs three parallel lines preferably running from the sending to the receiving end over different routes. Three magnetic cores are provided at the sending and three at the receiving end. Each magnetic core for a three phase circuit interlinks three equal turn windings and each winding on each core at the sending end is connected to a separate phase of the sending bus at the sending end, and each winding at the receiving end is similarly connected. Each conductor of a three phase transmission line connects a phase of the sending bus to a corresponding phase of the receiving bus through one of said coils at the sending end and at the receiving end. The three coils connected to a three phase transmission line at the sending end and at the receiving end are each located on a different core and provided the three phase loads are substantially balanced among the lines constituting the three phase transmission system as to both current and power factor, the three coils on any core will each carry current of the same magnitude but of different phase, so that the magnetomotive force of three coils on a given core will sum up to zero.

It will be obvious to one skilled in the art, that where many feeders each carry power from a switching station to separate loads or to loads having relatively high impedance circuits connecting them, these circuits may be connected to draw substantially equal amounts of power from each of three separate group busses. These three group busses may be connected to the main switching station bus through three winding transformers exactly as the three transmission lines are shown to be connected to the sending bus in the previous paragraph.

It is an object of this invention to provide reactor-transformer means intermediate three transmission circuits and their source of power whereby upon a short circuit or other fault on one such circuit voltage is transformed by said reactor-transformer means from the faulty line to the sound lines.

It is a further object of this invention to interpose reactor-transformer means between transmission circuits and a system with solidly grounded neutral, said reactor-transformer means cooperating to reduce the current flowing to a ground fault to a predetermined value fixed by the magnetizing current of the transformers.

It is a further object of this invention to provide a novel power transmission system wherein the power currents, upon the occurrence of a short circuit, are prevented from flowing into such short circuit but are compelled to continue on the conductors through the point of short circuit to their destination. Hence, the power currents flowing in a short circuited transmission line of this invention are the same after a short circuit as before the occurrence of the same. The magnetizing currents of the system of reactor-transformer means at the sending end and at the receiving end (if used) are superimposed on these power currents.

These and other objects of this invention may be more clearly understood by referring to the drawing in which:—

Figure 1:
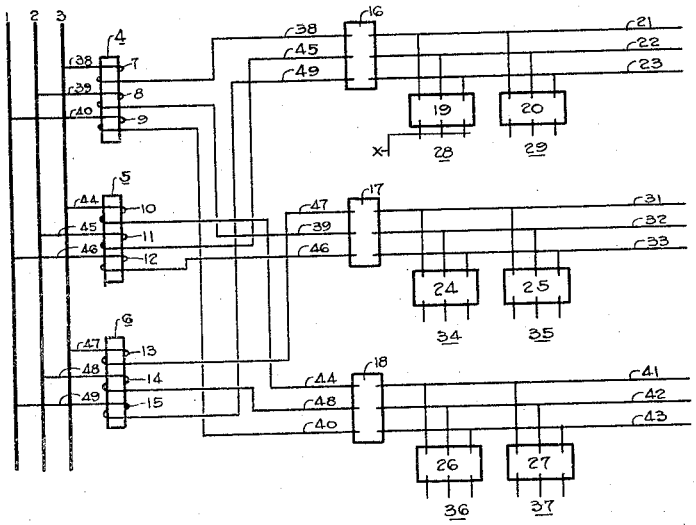
Figure 1 represents a three phase bus feeding energy to three group busses through 3 three phase transformers.

Figure 1 shows a three phase power bus 1, 2, 3 feeding energy to three group feeder busses 21, 22, 23; 31, 32, 33; and 41, 42, 43 through circuit breakers 16, 17, 18 respectively. Reactor-transformer means 4, 5, 6 have separately insulated coils 7, 8, 9; 10, 11, 12; and 13, 14, 15 respectively mounted on respective cores. Feeder bus conductor 21 is connected to power bus conductor 3 through coil 7 of reactor-transformer means 4 by wire 38. Feeder bus conductor 22 is connected to power bus conductor 2 through coil 11 of reactor-transformer means 5 by wire 45. Feeder bus conductor 23 is connected to power bus 1 through coil 15 of reactor-transformer means 6 by wire 49. Feeder bus conductor 31 is connected to power bus conductor 3 through coil 13 of reactor-transformer means 6 by wire 47. Feeder bus conductor 32 is connected to power bus conductor 2 through coil 8 of reactor-transformer means 4 by wire 39. Feeder bus conductor 33 is connected to power bus conductor 1 through coil 12 of reactor-transformer means 5 by wire 46. Feeder bus conductor 41 is connected to power bus conductor 3 through coil 10 of reactor-transformer means 5 by wire 44. Feeder bus conductor 42 is connected to power bus conductor 2 through coil 14 of reactor-transformer means 6 by wire 48. Feeder bus conductor 43 is connected to power bus conductor 1 through coil 9 of reactor-transformer means 4 by wire 40. Feeders 28 and 29 are shown connected to feeder bus 21, 22, 23 through circuit breakers 19 and 20 respectively. Feeders 34 and 35 are shown connected to feeder bus 31, 32, 33 through circuit breakers 24 and 25 respectively. Feeders 36 and 37 are shown connected to feeder bus 41, 42, 43 through circuit breakers 26 and 27 respectively.

Figure 2:
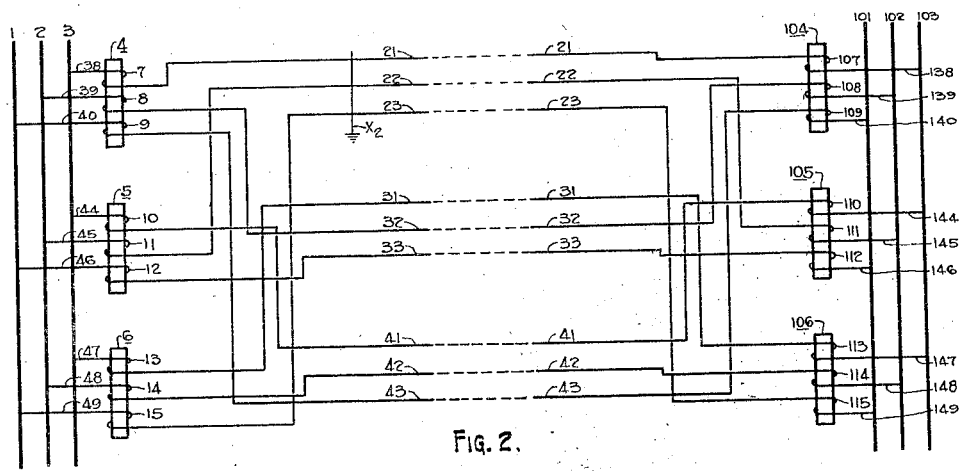
Figure 2 represents a transmission system consisting of 3 three phase transmission lines connecting a sending bus to a receiving bus through sending and receiving transformers.

Figure 2 shows a power bus 1, 2, 3 feeding power to 3 three phase transmission lines 21, 22, 23; 31, 32, 33; and 41, 42, 43 through reactor-transformer means 4, 5, and 6 in the same manner as power bus 1, 2, 3 (Fig. 1) feeds power to feeder busses 21, 22, 23; 31, 32, 33; and 41, 42, 43 through reactor-transformer means 4, 5, and 6. A receiving bus 101, 102, 103 receives power from transmission lines 21, 22, 23; 31, 32, 33; and 41, 42, 43 through reactor-transformer means 104, 105, 106. The connections between the transmission lines and bus are made through coils 107, 108, 109; 110, 111, 112; and 113, 114, 115 in the same manner as at the sending end.

Figure 3:
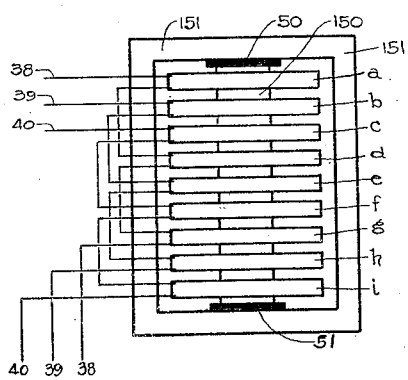
Figure 3 represents a three phase reactor-transformer means adapted for use in the present invention.

Figure 3 represents the reactor-transformer means 4 (Fig. 1) used in the present invention. A number of equal turn coils (nine in this case) *a* to *i* inclusive are mounted on leg 150 of core 150—151 and are connected in three groups, every third coil being connected in a group. Each of these three groups constitutes one of the windings as 7, 8, and 9 Fig. 1. Gaps in the magnetic circuit of the core 150—151 as at 50 and 51 are closed by insulating material as shown.

The operation of this device is as follows. If the six feeders 28, 29; 34, 35; and 36, 37 of Figure 1 are equally loaded, then all the windings 7 to 15 inclusive will carry equal currents and the currents in the three windings of each reactor-transformer means as, for example, windings 7, 8, and 9 of reactor-transformer means 4 will be equivalent to the three currents of a balanced three phase load and the coils are so connected that the magnetomotive force of the three coils adds up to substantially zero and very little magnetism flows around the closed magnetic circuit 150, 151 Figure 3. Under such a balanced load condition the only reactance voltage induced in the coils as 7, 8, and 9 of reactor-transformer means 4 will be that due to leakage flux interlinking the individual coils and this may be held to a desired low value. On the other hand, if a three phase fault should occur on a feeder, as at X on feeder 28, a magnetizing current will flow in the windings connected in series circuit with the fault X, i. e. in the windings 7 of reactor-transformer means 4; 11 of reactor-transformer means 5; and 15 of reactor-transformer means 6. These currents flowing in individual coils of the several reactor-transformer means as in coil 7 of reactor-transformer means 4 will not be balanced by corresponding currents in the other two windings, as 8 and 9 of reactor-transformer means 4, and hence there will be a large magnetomotive force acting as in coil 7 and not counterbalanced. This magnetomotive force will cause a relatively great flux to flow in the magnetic circuit 150—151 and link all coils of a transformer as windings 7, 8, and 9 of reactor-transformer means 4. This flux will act to step down the voltage of group feeder bus 21 and the voltage induced in windings 8 and 9 will act to increase the voltage of feeder busses 32 and 43. In the same manner the voltages of group feeder busses 22 and 23 will be stepped down and the voltages of group feeder busses 41 and 33 and 31 and 42 will be increased. It is therefore evident that the current flowing to a fault on an individual feeder as 28 will be limited to the magnetizing current of the reactor-transformer means 4, 5, and 6 and these members will act to transfer the voltage from a faulty feeder to the sound feeders. The amount of the magnetizing current flowing to a fault as at X will be determined largely by the size of the gaps in the magnetic circuits 150—151 of the reactor-transformer means as at 50 and 51 (Figs. 3).

It will be obvious to one skilled in the art that the reactor-transformer means 104, 105, and 106 in the case of a fault as at X2 perform the same as the reactor-transformer means 4, 5, and 6 and cooperate to transfer power from lines 21, 22, and 23 to lines 31, 32, 33; 41, 42, 43.

It will be apparent to one skilled in the art that the gaps 50 and 51 (see Fig. 3) in the magnetic circuits of the reactor-transformer means, are relatively large so that the magnetizing current flowing through coils 7, 11 and 15, upon the occurrence of a short circuit at X in Fig. 1 or X2 in Fig. 2, will be very considerable, in fact this magnetizing current will be sufficiently large to pull down the voltage on main bus 1, 2, and 3 a substantial amount. Thus, for example, the voltage on the main bus may be reduced as much as one-third so that only two-thirds normal voltage is supplied by this main bus. This condition will cause the voltage on the stub or feeder busses 31, 32, and 33 and 41, 42 and 43 to be substantially 50% greater than the voltage on the main bus owing to the operation of the reactor-transformer means, and hence there will be substantially 100% voltage or normal voltage on the stub busses 31, 32 and 33 and 41, 42 and 43.

As many changes could be made in the above construction and many apparently widely different embodiments of this invention could be made thereof, it is intended that all matter contained in the above description or shown in the accompanying drawing shall be interpreted as illustrative and not in a limiting sense.

What is claimed is:—

1. In a power transmission system, in combination, a three phase station bus having three bus conductors, three three phase lines, each of said lines having three conductors, three reactor-transformer means, each of said reactor-transformer means having a core and three windings on said core, the said windings of each reactor-transformer means being respectively connected in series between a respective one of said station bus conductors and a line conductor of corresponding phase of a respective one of said lines, whereby in use the three windings of each reactor-transformer means respectively carry currents passing between a respective one of said station bus conductors and a corresponding phase conductor of a respective one of said lines.

2. In a power transmission system, in combination, a three phase station bus having three bus conductors, three three phase lines, each of said lines having three conductors, three reactor-transformer means having a core provided with an air gap and three separately insulated windings on said core, the said windings of each reactor-transformer means being respectively connected in series between a respective one of said station bus conductors and a line conductor of corresponding phase of a respective one of said lines, whereby, upon the occurrence of a fault on the three conductors of one of said lines, a relatively heavy magnetizing current will flow in one winding of each of said reactor-transformer means, thereby building up the voltage on the remaining lines.

3. In a power transmission system, in combination, a three phase station bus having three bus conductors, three three phase lines, each of said lines having three conductors three reactor-transformer means, each of said reactor-transformer means having three inductively related windings, the said windings of each reactor-transformer means being respectively connected in series between a respective one of said station bus conductors and a line conductor of corresponding phase of a respective one of said lines, whereby, upon the occurrence of a fault on one conductor of one of said lines, a relatively heavy magnetizing current will flow in that winding of the reactor-transformer means to which said conductor is connected, thereby building up the voltage in the remaining two windings of said reactor-transformer means and in the two line conductors connected thereto, each of said two line conductors being in a respective one of the remaining lines.

In testimony, that I claim the invention set forth above I have hereunto set my hand this 10th day of December, 1931.

FRAZER W. GAY.